United States Patent
Kusbel et al.

(10) Patent No.: US 7,103,342 B2
(45) Date of Patent: Sep. 5, 2006

(54) SYSTEM AND METHOD FOR REDUCING THE EFFECTS OF CLOCK HARMONIC FREQUENCIES

(75) Inventors: Patrick Kusbel, Longmont, CO (US); Cheng Tan, Boulder, CO (US); Troy Curtiss, Erie, CO (US)

(73) Assignee: Kyocera Wireless Corp., San Diego, CA (US)

( * ) Notice: Subject to any disclaimer, the term of this patent is extended or adjusted under 35 U.S.C. 154(b) by 0 days.

(21) Appl. No.: 11/205,625

(22) Filed: Aug. 17, 2005

(65) Prior Publication Data

US 2006/0057970 A1   Mar. 16, 2006

Related U.S. Application Data

(63) Continuation of application No. 09/998,458, filed on Nov. 29, 2001, now Pat. No. 6,999,723.

(51) Int. Cl.
*H04B 1/00* (2006.01)
*H04B 15/00* (2006.01)
*H04B 1/10* (2006.01)

(52) U.S. Cl. .................. 455/296; 455/63.1; 455/183.2; 455/310; 375/346

(58) Field of Classification Search ............... 455/63.1, 455/114.1, 114.2, 254, 283, 296, 255–260, 455/310, 317, 183.2; 375/346
See application file for complete search history.

(56) References Cited

U.S. PATENT DOCUMENTS

| | | | |
|---|---|---|---|
| 4,229,699 A * | 10/1980 | Frissell ....................... 327/114 |
| 4,879,758 A | 11/1989 | DeLuca et al. |
| 4,905,305 A * | 2/1990 | Garner et al. ............. 455/183.2 |
| 5,212,833 A * | 5/1993 | Suda et al. ............... 455/183.2 |
| 5,263,055 A * | 11/1993 | Cahill ......................... 375/346 |
| 5,745,848 A * | 4/1998 | Robin ......................... 455/296 |
| 5,794,131 A | 8/1998 | Cairns |
| 5,926,514 A * | 7/1999 | Meador et al. ............. 375/346 |
| 6,345,172 B1 * | 2/2002 | Hirai et al. .................... 455/76 |
| 6,567,654 B1 * | 5/2003 | Coronel Arredondo et al. .......................... 455/315 |
| 6,735,428 B1 * | 5/2004 | Tsukuda ..................... 455/296 |
| 6,898,721 B1 * | 5/2005 | Schmidt ..................... 713/322 |
| 2005/0003762 A1 * | 1/2005 | Kerth et al. ............... 455/63.1 |

* cited by examiner

*Primary Examiner*—Simon Nguyen

(57) ABSTRACT

A system and a method are provided for reducing the effects of spurious frequencies in a wireless communications device. The system comprises a processor having a reference frequency input and a clock having an output connected to the processor input. The clock supplies a clock frequency, or reference frequency, to the processor. The reference frequency is the frequency at which the processor operates. The clock also has an input for selecting a reference frequency to provide to the processor. The system also includes a transceiver having a plurality of selectable communications passbands. If the wireless communications device is a telephone, for example, the transceiver frequency (passband) may change as a function of the mode in which the phone is operating (AMPS, PCS, GSM, CDMA, or W-CDMA). In response to changing operating modes (transceiver passband), the clock frequency is adjusted. The clock frequency is selected so that harmonic frequencies associated with the clock frequency do not substantially interfere with the transceiver passband.

10 Claims, 2 Drawing Sheets

SYSTEM AND METHOD FOR REDUCING THE EFFECTS OF CLOCK HARMONIC FREQUENCIES

RELATED APPLICATIONS

This is a continuation application of U.S. application Ser. No. 09/998,458, filed on Nov. 29, 2001 now U.S. Pat No. 6,999,723.

BACKGROUND OF THE INVENTION

1. Field of the Invention

This invention generally relates to wireless communications and, more particularly, to a system and method for reducing the effects of clock generated harmonics in the transceiver passband of a wireless communications device.

2. Description of the Related Art

Processors, such as microprocessors, are an integral part of many electronic products, including a typical wireless communications device. Microprocessors are typically used to execute instruction sets and to generally control the operation of devices. A clock is used with the typical microprocessor to provide a frequency at which the microprocessor operates. A crystal is a conventional and inexpensive way of supplying a microprocessor reference frequency. As is well known, spurious frequencies such as harmonics, are generated by the clock, along with the desired clock frequency (reference frequency). These spurious frequencies, as well as the crystal resonant frequency, "leak" through to other circuits on the device printed circuit board through conductance on the power lines or grounds, and through radiation. These clock frequencies can interfere with the operation of a device by unintentionally mixing with other frequencies that are generated on the board.

A wireless communication device transceiver circuit is especially susceptible to interference from spurious signals. In some instances, the spurious signals have frequencies equal to the carrier frequency of the wireless communications device. These spurious signals may provide undesirable noise and degrade performance of the device. For example, noise in the passband of a receiver can degrade sensitivity, while noise in a transmitter passband can violate system specifications, or raise the general noise floor of the system in which the wireless device is operating.

To solve spurious signal and interference problems, it is typically necessary to add filtering circuits or shielding to the circuit board. However, this solution takes time and adds to the total parts count. In some instances, the size and position of the board may limit the filtering that can be provided. It is known to change the clock frequency to avoid harmonic interference with the local oscillator or other transceiver circuitry. However, it is not desirable to reselect wireless device crystals to accommodate printed circuit board filtering issues. In wireless devices that operate with more than one transceiver frequency, it may be difficult to find a single clock frequency that supports the operation of the digital circuitry, and yet avoids interfering with at least one of the transceiver frequencies.

It would be advantageous if the undesirable effects of spurious frequencies, such as those harmonically related to a clock, could be eliminated from or substantially reduced in the passband of a transceiver without special filtering.

It would be advantageous if a wireless communications device could be operated at a plurality of transceiver frequencies while reducing the noise effects of spurious signals related to clock generated harmonics.

SUMMARY OF THE INVENTION

The present invention was created to address the problem of reducing the effects of clock-generated harmonics in the transceiver passband of a wireless communications device. The invention recognizes that the harmonics generated by a clock can leak through to the transceiver and cause sensitivity, noise, and system specifications problems in the wireless device. The invention also recognizes that the avoidance of harmonics by the use of filtering circuits or shielding, or by changing crystals is not always desirable or effective. The invention addresses the above-mentioned problem by selectively adjusting clock frequencies so that the harmonics associated with the selected clock frequency do not substantially interfere with the operating passband of the transceiver.

Accordingly, a system is provided for reducing the effects of spurious frequencies that substantially interfere with the performance of a wireless communications device. The system comprises a processor having a reference frequency input and a clock having an output connected to the processor input to supply the clock frequency, or reference frequency. The reference frequency is the frequency at which the processor operates. The clock has an input for selecting a reference frequency to provide to the processor.

The system also includes a transceiver supplying a plurality of selectable communications passbands. If the wireless communications device is a telephone for example, the transceiver frequency (passband) changes as a function of the mode in which the phone is operating (advanced mobile phone service (AMPS), personal communication services (PCS), global system for mobile communications (GSM), code division multiple access (CDMA), or wideband CDMA (W-CDMA)). In response to changing operating modes, the clock adjusts the clock frequency. The clock frequency is selected so that harmonic frequencies associated with the clock frequency do not substantially interfere with the transceiver passband.

Additional details of the above-described system and a method for reducing the effects of spurious frequencies in a wireless device are presented below.

DETAILED DESCRIPTION OF THE PREFERRED EMBODIMENTS

Figure 1:
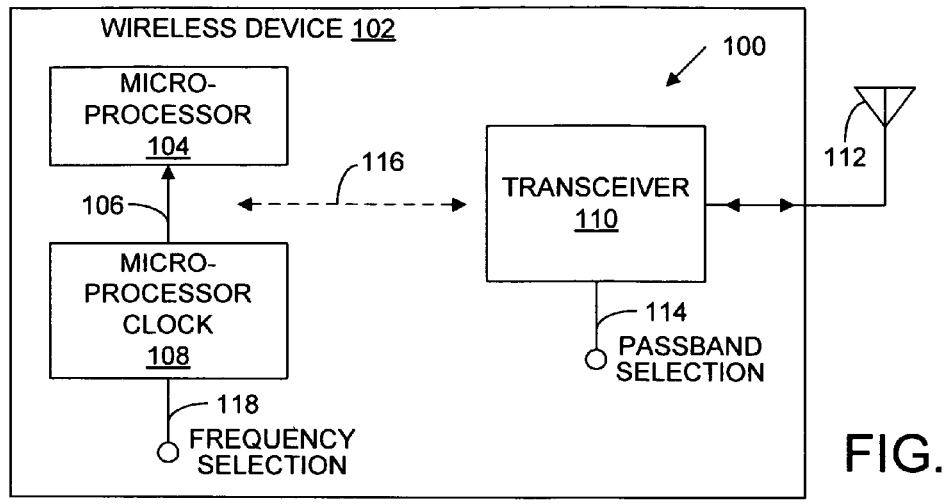
FIG. 1 is a schematic block diagram depicting the system for reducing the effects of spurious frequencies in a wireless communications device in accordance with the present invention.

FIG. 1 is a schematic block diagram depicting the system 100 for reducing the effects of spurious frequencies in a wireless communications device 102 in accordance with the present invention. The device 102 includes a microprocessor 104 with an input on line 106 to accept a reference clock frequency. A clock 108 has an output on line 106 to supply a clock (reference) frequency to the microprocessor 104. This clock frequency is often the fundamental frequency of a crystal source. The clock 108 is capable of providing a plurality of predetermined clock frequencies, as described below.

It will be appreciated that other types of processors and designs may be substituted for the microprocessor and clock. For example, a processor and a clock may be provided on an application specific integrated circuit as a single component. Also, other types of processors, such as gate arrays or other programmable logic devices may by used.

A transceiver 110 has a port to transmit and receive a carrier frequency via an airlink interface. The airlink interface is represented by antenna 112. The transceiver 110 may include de/modulating circuits, power amplifiers, receivers, frequency sources, and other components (not shown), but well known in the art. The transceiver is typically a multi-band transceiver having an input on line 114 for accepting commands selecting one of a plurality of communication passbands. Alternately but not shown, the device 102 includes a plurality of transceivers, each tuned to operate in a different passband.

Harmonics are generated by the clock 108, along with the desired clock frequency needed to operate the microprocessor 104. These harmonics can appear as spurious frequencies that can radiate or conduct into the transceiver 110, interfering with the carrier frequencies. The radiation or conduction of these spurious frequencies are represented by the dashed line with the reference designator 116. Although the harmonics can be filtered or shielded from the transceiver 110, this problem is often more directly solved by selecting a crystal frequency with harmonics that avoid the transceiver passband. However, selecting a crystal frequency that generates harmonics outside the transceiver passband can become difficult, or even impossible, if the device 102 has multiple transceivers or if the transceiver 110 is expected to operate at more than one carrier frequency (as shown).

To this end, the microprocessor 104 operates at more than one clock (reference) frequency. The clock 108 has an input on line 118 to accept selections for reference frequencies, and supplies clock frequencies in response to the selections on line 118. In some aspects of the system 100, the clock 108 can be a bank of selectable crystals or a frequency synthesis system.

The following example illustrates the operation of the present system 100. When the wireless device 102 is operating in a first mode, such as code division multiple access (CDMA), the clock 108 provides a first reference frequency to the microprocessor 104. In turn, the transceiver 110 operates in the CDMA passband of approximately 1900 megahertz (MHz). The CDMA passband is selected in response to commands on line 114. When the wireless device 102 switches to a second mode, such as the AMPS (analog) mode, in response to commands on line 114, the transceiver 110 switches passband frequencies. The AMPS center frequency is approximately 900 MHz.

If the first reference frequency generated by clock 108 has an associated harmonic that occurs at 900 MHz, the transceiver signals may be degraded when the transceiver 110 switches to the AMPS mode. To avoid such interference, a second reference frequency is selected using the clock 108 input on line 118. In response, the clock 108 provides the second reference frequency to the microprocessor 104 on line 106. The second reference frequency is predetermined so that the harmonics associated with it do not interfere with the second mode (AMPS) passband.

More specifically, if the first reference frequency is 19.2 MHz, the 46th harmonic is 883.2 MHz. This is a frequency that does not interfere with the CDMA passband centered around 1900 MHz. However, the 46th harmonic does interfere with the transceiver 110 when switched into the AMPS mode at approximately 900 MHz. To solve the interference problem, the second reference frequency is selected to be 26.24 MHz. The 46th harmonic at 1207 MHz is far removed from the AMPS passband.

Figure 2:
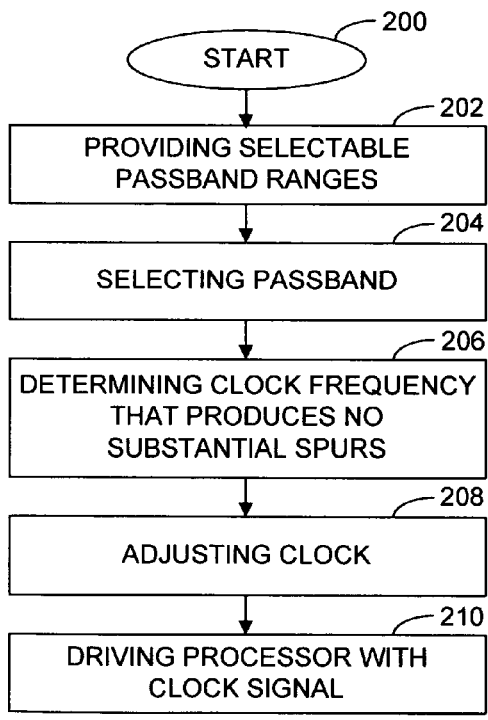
FIG. 2 is a flowchart illustrating the method for reducing the effects of spurious frequencies in a wireless communications device in accordance with the present invention.

FIG. 2 is a flowchart illustrating the method for reducing the effects of spurious frequencies in a wireless communications device in accordance with the present invention. Although the method (and the other methods described below) is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 200. Step 202 provides a plurality of selectable passband ranges for the wireless communications device. Step 204 selects one of the passband frequency ranges. Step 206 determines a clock frequency that produces no substantial spurious signals (spurs) in the selected passband frequency range. Step 208 adjusts a clock to generate a clock signal at the clock frequency. Step 210 drives a processor with the clock signal. In one aspect of the invention, selecting one of the passband frequency ranges in Step 204 includes providing a cellular passband frequency range and a PCS passband frequency range.

Figure 3:
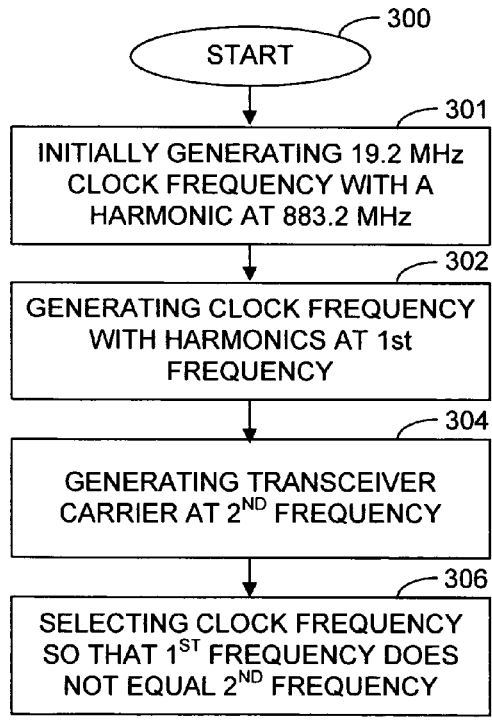
FIG. 3 is a flowchart illustrating the method for avoiding spurious frequencies in the transceiver passband of a wireless communications device in accordance with the present invention.

FIG. 3 is a flowchart illustrating the method for avoiding spurious frequencies in the transceiver passband of a wireless communications device in accordance with the present invention. The method starts at Step 300. Step 302 generates a clock frequency with harmonics at a first frequency. Step 304 generates a transceiver carrier at a second frequency. Step 306 selects the clock frequency so that the first frequency does not equal the second frequency.

In some aspects of the method, generating a transceiver carrier at a second frequency in Step 304 includes generating a transceiver carrier with a center frequency of approximately 900 MHz. A further step, Step 301, initially generates a clock frequency at 19.2 megahertz (MHz) with a 46th harmonic at 883.2 MHz. Then, selecting the clock frequency so that the first frequency does not equal the second frequency in Step 306 includes increasing the clock frequency from 19.2 MHz to 26.24 MHz.

Figure 4:
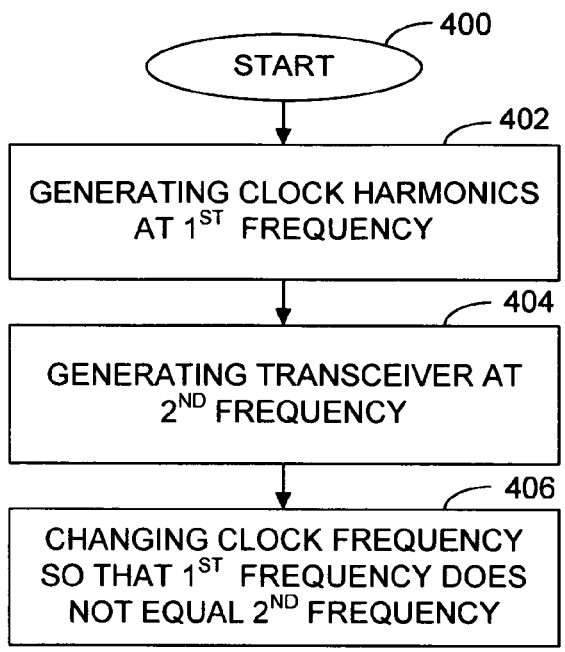
FIG. 4 is a flowchart illustrating the method for reducing the effects of clock harmonics in the passband of a wireless communications device in accordance with the present invention.

FIG. 4 is a flowchart illustrating the method for reducing the effects of clock harmonics in the passband of a wireless communications device in accordance with the present invention. The method starts at Step 400. Step 402 generates a clock frequency with harmonics at a first frequency. Step 404 generates a transceiver carrier at a second frequency. Step 406 changes the clock frequency so that the first frequency does not equal the second frequency.

Figure 5:
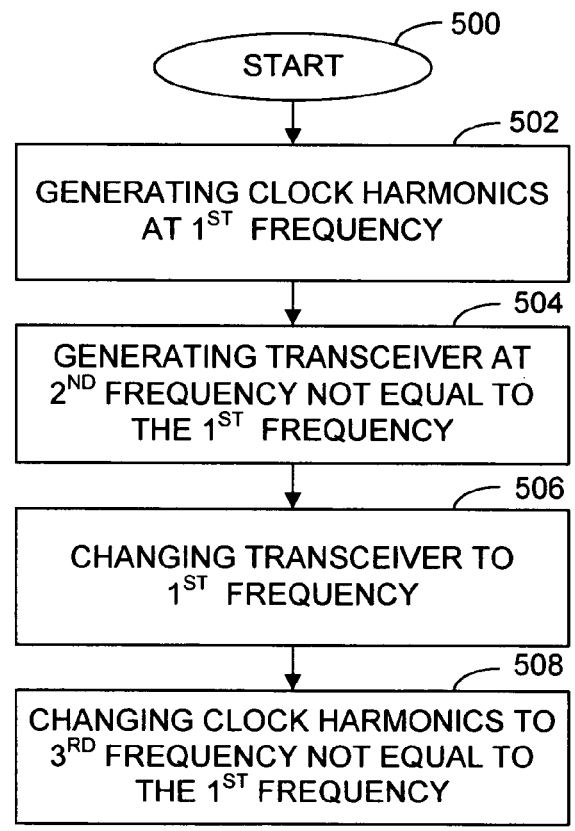
FIG. 5 is a flowchart illustrating another aspect of the method for reducing the effects of clock harmonics in the passband of a wireless communications device in accordance with the present invention.

FIG. 5 is a flowchart illustrating another aspect of the method for reducing the effects of clock harmonics in the passband of a wireless communications device in accordance with the present invention. The method starts at Step 500. Step 502 generates a clock frequency with harmonics at a first frequency. Step 504 generates a transceiver carrier at a second frequency not equal to the first frequency. Step 506 changes the transceiver carrier to the first frequency. Step 508 changes the clock frequency to a clock frequency with harmonics at a third frequency, not equal to the first frequency.

A system and a method are provided for reducing the effects of spurious frequencies in the transceiver passband of a wireless communications device. Examples of the invention have featured specific reference frequencies, passband frequencies, and modes of operation, however, it should be understood that the present invention is not limited to any particular frequencies or modes of operation. Examples have also been given of a wireless telephone device, however, it should be understood that the invention is applicable to a broader field of wireless operations. Other variations and embodiments of the invention will occur to those skilled in the art.

We claim:

1. A method for reducing effects of spurious frequencies in a wireless communications device, the method comprising:
    powering up the wireless communications device in a first mode of operation comprising one of an analog mode and a digital mode, the first mode of operation corresponding to a first passband frequency range of a plurality of selectable passband frequency ranges;
    operating a processor in a default processor clock frequency of a plurality of processor clock frequencies, the default processor clock frequency corresponding to a second mode of operation comprising the other of the analog mode and the digital mode;
    determining that the default processor clock frequency produces spurious signals in the first passband frequency range;
    switching to a first processor clock frequency of the plurality of processor clock frequencies that produces no substantial spurious signals in the first mode of operation; and
    maintaining the first processor clock frequency as song as the wireless communications device operates in the first mode of operation.

2. The method of claim 1, wherein the analog mode comprises advanced mobile phone service (AMPS).

3. The method of claim 1, wherein the digital mode comprises a code division multiple access (CDMA) mode.

4. The method of claim 1, wherein the first mode of operation is an analog mode; and wherein the default processor clock frequency corresponds to a digital mode.

5. The method of claim 1, wherein the digital mode comprises one of a global system for mobile communications (GSM) mode, and a code division multiple access (CDMA) mode.

6. A wireless communication device comprising:
    a microprocessor having a reference frequency input, a clock selection output, and a command selection output, the microprocessor for selecting one of at least two operation modes comprising a digital mode and an analog mode, and for outputting the selected operation mode on the command selection output;
    a clock having a clock output connected to the reference frequency input of the microprocessor, and an input connected to the clock selection output of the microprocessor, the clock outputting a default frequency clock corresponding to a first operation mode of the at least two operation modes upon a start up condition, the first frequency clock producing a first set of harmonic frequencies;
    a multiband transceiver for transceiving a plurality of selectable communication passbands, the multiband transceiver having at a transceiver input connected to the command selection output of the microprocessor, the plurality of selectable communication passbands comprising:
        a first communication passband corresponding to the first operation mode; and
        a second communication passband corresponding to a second operation mode, wherein the first set of harmonic frequencies interferes with the second communication passband;
    wherein the microprocessor selects a second frequency clock having a second set of harmonic frequencies that do not interfere with the second communication passband when the second communication passband is active upon the start up condition, and maintains the second frequency clock on the reference frequency input as long as the second communication passband is selected.

7. The system of claim 6, wherein the analog mode comprises:
    advanced mobile phone service (AMPS).

8. The system of claim 6, wherein the digital mode comprises one of
    a global system for mobile communications (GSM) mode, and
    a code division multiple access (CDMA) mode.

9. The system of claim 6, wherein the clock is connected to a crystal source, and the default frequency clock is a fundamental frequency of the crystal source.

10. The system of claim 6, wherein the second operation mode is an analog mode; and wherein the default frequency clock corresponds to a digital mode.

* * * * *